United States Patent [19]

Williams

[11] 4,391,290

[45] Jul. 5, 1983

[54] ALTITUDE SENSING CONTROL APPARATUS FOR A GAS TURBINE ENGINE

[75] Inventor: Raymond L. Williams, Evendale, Ohio

[73] Assignee: General Electric Company, Cincinnati, Ohio

[21] Appl. No.: 200,221

[22] Filed: Oct. 23, 1980

[51] Int. Cl.³ .................... F16K 31/12; F16K 49/00; F16K 37/00

[52] U.S. Cl. .................. 137/81.1; 137/340; 137/556; 251/29; 60/39.75; 60/39.83

[58] Field of Search .................. 91/416, 417 R, 420, 91/452, 6; 137/81.1, 84, 556, 556.3, 340; 251/28, 29; 60/39.75, 39.82

[56] References Cited

U.S. PATENT DOCUMENTS

| | | | |
|---|---|---|---|
| 2,371,428 | 3/1945 | Giers et al. | 251/29 |
| 2,633,868 | 4/1953 | Berhoudar | 137/556 |
| 2,668,415 | 2/1954 | Lawrence | 137/81.1 X |
| 2,741,088 | 4/1956 | Andrews et al. | 60/39.28 |
| 2,911,790 | 11/1959 | Brahm | 91/416 |
| 2,981,058 | 4/1961 | Reed | 137/84 |
| 3,355,992 | 12/1967 | Jacobson et al. | 91/47 |
| 3,393,606 | 7/1968 | Maynami et al. | 91/47 |
| 3,403,598 | 10/1968 | Franz et al. | 91/47 |
| 3,596,669 | 8/1971 | Alberani | 137/81.1 |
| 3,875,957 | 4/1975 | Veit et al. | 137/495 X |
| 3,967,533 | 7/1976 | Tyler | 91/416 X |
| 4,069,662 | 1/1978 | Redinger, Jr. et al. | 60/226 R |
| 4,200,120 | 4/1980 | Kimata et al. | 137/613 |
| 4,304,093 | 12/1981 | Schulze | 60/39.07 |

FOREIGN PATENT DOCUMENTS 404794  7/1943  Fed. Rep. of Germany ... 137/556.3

Primary Examiner—A. Michael Chambers
Attorney, Agent, or Firm—Derek P. Lawrence

[57] ABSTRACT

In one form of the invention, the control apparatus includes two stages: a poppet first stage and a piston second stage. The poppet first stage includes an altitude sensitive evacuated bellows coupled to a poppet valve. The second stage piston includes a pair of opposing head portions separated by a rod portion. The apparatus includes an output port which is coupled to a low pressure pneumatic signal or to a high pressure pneumatic signal, depending upon the position of the piston. For altitudes less than a predetermined altitude, e.g., 20,000 feet, the first stage develops a pneumatic servo signal which causes the piston to be in a first position which couples the output port of the apparatus to ambient air pressure. For altitudes greater than the predetermined altitude, the first stage develops a pneumatic servo signal which causes the piston to be in a second position which couples the output port of the apparatus to a high pressure pneumatic signal. The high pressure pneumatic signal may comprise the compressor discharge pressure of a gas turbine engine. Backup means is provided for accommodating failure of the bellows. Indicator and adjustment means are also provided for ensuring an accurate, reliable, and repeatable, control apparatus output signal.

6 Claims, 6 Drawing Figures

ALTITUDE SENSING CONTROL APPARATUS FOR A GAS TURBINE ENGINE

BACKGROUND OF THE INVENTION

The present invention relates to an altitude sensing control apparatus, and more particularly, to such apparatus which receives pneumatic inputs and develops a pneumatic output.

Many applications require altitude sensing control apparatus. For example, for aircraft gas turbine engine applications, it is often necessary to provide switching intelligence as a function of altitude. In one such application, altitude sensing control apparatus is utilized to operate an air valve which controls a flow of air toward an engine part. A typical use of such altitude sensing control apparatus is described in copending application of Wallace M. Schulze, Ser. No. 71,502, filed Aug. 31, 1979, now U.S. Pat. No. 4,304,093, issued 12/8/81, entitled "Variable Clearance Control for a Gas Turbine Engine," and assigned to the assignee of the present application. This copending application is hereby incorporated by reference to the present application.

As pointed out in the above-mentioned application of Ser. No. 71,502, altitude sensing control apparatus may be employed to pneumatically develop a pneumatic output signal to operate an air valve which controls a flow of air to the aircraft engine for controlling the clearance between rotating blades and a blade shroud in the engine. Such pneumatic operation eliminates the need to convert from operating mediums, such as engine fuel or oil, to a pneumatic output for operating the air valve. For such aircraft engine applications, it is essential that the output of the altitude sensing control apparatus be accurate, repeatable, and reliable. As such altitude sensing control apparatus may employ a portion of the compressor discharge to operate the air valve, the control apparatus is likely to be subject to relatively high temperatures, e.g., up to 1000° F.

Accordingly, it is a general object of this invention to provide improved altitude sensing control apparatus.

Another object of the present invention is to provide such apparatus which develops an accurate, repeatable, and reliable pneumatic output signal for operating an air valve.

Another object of the present invention is to provide such apparatus which develops a pneumatic output signal of relatively smaller pressure level for altitudes below a predetermined altitude and which develops a pneumatic output signal of relatively greater pressure level for altitudes greater than the predetermined altitude where the smaller pressure level does not operate the air valve while the greater pressure does operate the air valve.

Another object of the present invention is to provide such apparatus with operability indication means.

Another object of the present invention is to provide such apparatus which includes failure backup means for ensuring a desirable pneumatic output signal under failure conditions.

SUMMARY OF THE INVENTION

In one form of my invention, altitude sensing control apparatus is provided for a gas turbine engine of the type including a pressurizing section which receives an input airflow and develops a pressurized output airflow. The apparatus includes means coupled to ambient air for developing a first pneumatic signal representative of ambient air pressure. The apparatus includes means coupled to the pressurizing section for receiving a portion of the pressurized output airflow and developing a second pneumatic signal representative of the pressurized output airflow. Pneumatic valve switching means is provided for receiving the first and second pneumatic signals and developing a control apparatus pneumatic output signal. The control apparatus pneumatic output signal is the first pneumatic signal for ambient air pressures greater than a predetermined value which is representative of a predetermined altitude. The control apparatus pneumatic output signal is the second pneumatic signal for ambient air pressures less than the predetermined value.

BRIEF DESCRIPTION OF THE DRAWINGS

While the specification concludes with the claims particularly pointing out and distinctly claiming that which is regarded as the present invention, the objects and advantages of this invention can be more readily ascertained from the following description of preferred embodiments, when read in conjunction with the accompanying drawings, in which:

In FIG. 3, the control apparatus drive piston is shown in a first position while in FIG. 4, the drive piston is shown in a second position.

DETAILED DESCRIPTION OF THE INVENTION

Figure 1:
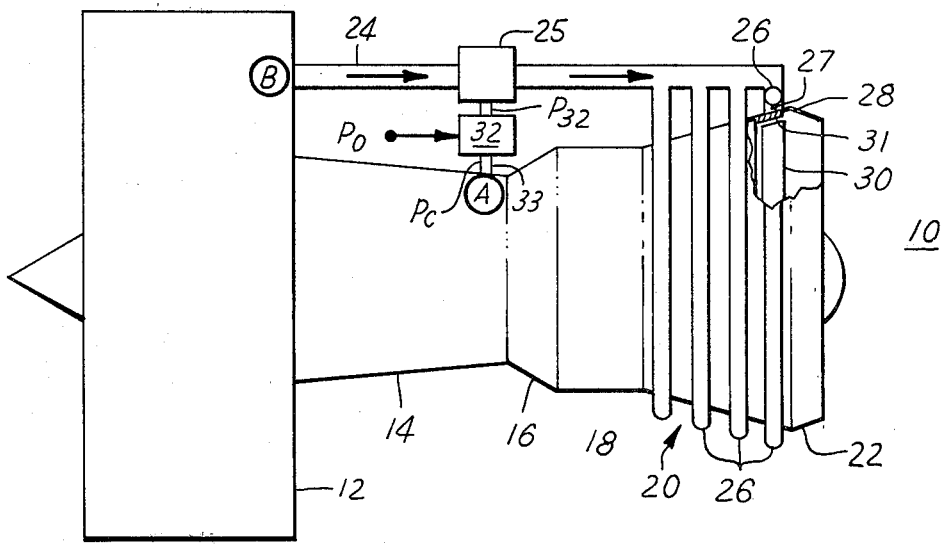
FIG. 1 is a schematic view showing one form of the altitude sensing control apparatus of the present invention in combination with an exemplary gas turbine engine.

Referring initially to FIG. 1, one form of altitude sensing control apparatus of the present invention is shown in connection with an exemplary gas turbine engine, generally designated 10. The gas turbine engine 10 may, for example, include: a fan section 12, a compressor section 14, a combustor section 16, a high pressure turbine section 18, a low pressure turbine section 20, and an exhaust section 22. Further details on the construction and operation of such an exemplary gas turbine engine 10 is found in previously mentioned application of Ser. No. 71,502, incorporated by reference herein.

As shown in FIG. 1, a conduit 24 is coupled to the fan 12 at locus B to receive a portion of the fan output flow. Conduit 24 functions to direct a portion of the fan output flow (shown as arrows) through an air valve 25 and then to a plurality of conventional cooling tubes 26. The cooling tubes 26 encircle the engine in an area of rotating blades, such as those in the low pressure turbine section 20. The cooling tubes 26 include holes 27 therein for communicating the airflow to impinge on the shroud supporting structure 28, e.g., the engine case.

The purpose of directing this air from the holes 27 to the structure 28 is to control the clearance between the rotating blades 30 and the shroud 31 which is coupled to the shroud supporting structure 28. An exemplary cooling tube structure is disclosed in previously mentioned application Ser. No. 71,502.

The air valve 25 is operated by one form of the altitude sensing control apparatus of the present invention, generally designated 32. The control apparatus 32 is coupled through conduit 33 to the compressor section 14 at locus A which, for example, may represent the compressor discharge. The input to the control apparatus 32 through conduit 33 thus represents a pneumatic signal which will hereinafter be designated $P_c$. The control apparatus 32 is also coupled to ambient air pressure, hereinafter sometimes designated $P_o$.

As will be explained more fully later, the control apparatus 32 functions to receive two pneumatic input signals, i.e., $P_o$ and $P_c$, and develop a pneumatic output signal $P_{32}$ which comprises $P_o$ for altitudes below a predetermined altitude and which comprises $P_c$ for altitudes greater than a predetermined altitude. The pneumatic signal $P_c$ is of sufficient value to operate the air valve 25 and allow cooling air therethrough while pneumatic signal $P_o$ is insufficient to operate the air valve 25, forcing it to a closed position.

Figure 2:
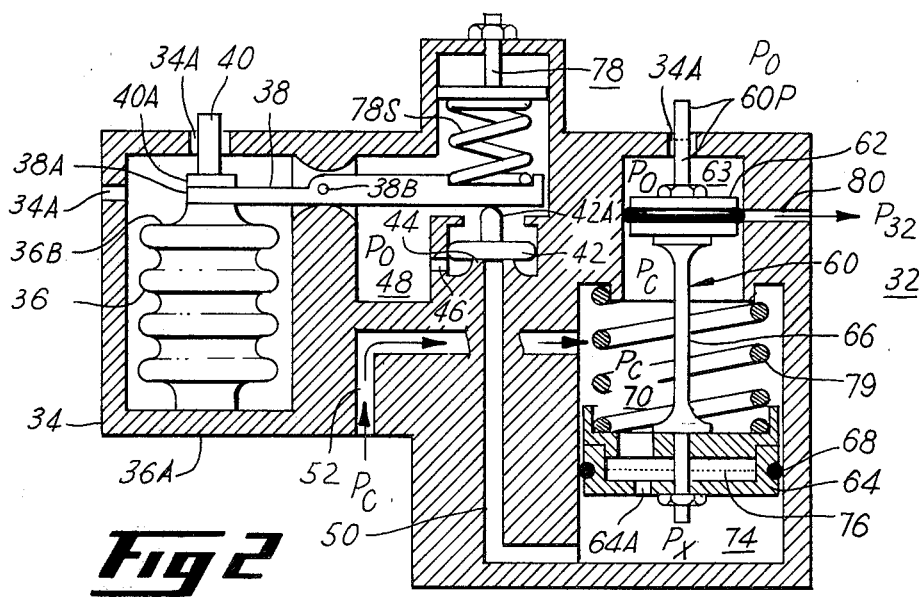
FIG. 2 is a simplified, partially sectioned view, showing the altitude sensing control apparatus of FIG. 1 in further detail.

Referring now to FIG. 2, one form of the control apparatus 32 of the present invention will be described in further detail. The control apparatus 32 includes a housing 34 containing therein two stages. The first stage functions to sense altitude and develop an intermediate or servo pneumatic signal, designated $P_x$, which varies widely enough to drive a piston second stage to either of two positions. At one of these two piston positions, an output port 80 of the control apparatus 32 is coupled to pneumatic signal $P_o$ while at the other piston position, the output port 80 of the control apparatus is coupled to pneumatic signal $P_c$.

The first stage of the control apparatus 32 includes an evacuated bellows 36, one portion 36A of which is fixedly coupled to the housing 34. An opposing, movable portion 36B of the bellows 36 is coupled to connecting link 38 at 38A and to indicator link 40 at 40A. Connecting link 38 extends through pivot 38B to contact a poppet 42 at 42A. Housing 34 includes a number of ports 34A which allow ambient air at pressure $P_o$ to enter various chambers within the housing 34.

Poppet 42 is movably disposed in poppet seat 44 to interface between chamber 48, which is at $P_o$ ambient pressure, and conduit 50. The poppet seat 44 includes a port 46. In the position shown in FIG. 2, as a result of the bellows 36 and link 38 position, poppet 42 is in sealing contact with the seat 44, thereby sealing chamber 48 from conduit 50.

A conduit 52 is coupled to receive the compressor discharge pneumatic signal $P_c$ and to direct this pneumatic signal to sliding piston 60. Sliding piston 60 comprises opposing head portions 62 and 64, axially separated by a rod portion 66. Conventional sliding seals 68 are provided. Housing port 34A couples a region 63 defined between piston head 62 and housing 34 to ambient air at $P_o$ pressure. Conduit 52 is coupled to the region 70 defined between the head portions 62 and 64. Head portion 64 includes a servo orifice 64A therethrough which allows a predetermined small airflow to pass from region 70 to the region 74 defined between head portion 64 and housing 34. The region 74 is coupled to the poppet 42 through the previously mentioned conduit 50. As will be more fully understood later, the servo orifice 64A is an important part of the control apparatus 32. The servo orifice 64A causes the pneumatic pressure $P_x$ in region 74 to approach $P_o$ when the poppet 42 is off its seat and allows $P_x$ to approach $P_c$ when the poppet is seated. It is the variation in $P_x$ which forces the piston 60 to either of its two positions.

In the operation of the control apparatus 32, the movable portion 36B of the bellows 36 is positioned as a function of ambient air pressure $P_o$, which is directly related to altitude. As is well known in the art, suitable choice of materials and/or bellows dimensions provides appropriate bellows movement through a range of altitudes, including the predetermined altitude.

FIG. 2 shows the control apparatus 32 at the predetermined altitude, i.e., at the switching point. At this altitude, the poppet 42 is shown seated and the piston 60 is blocking the output port 80 of the housing 34. Thus, the ambient pressure $P_o$ of region 63, as well as the higher discharge pressure $P_c$, are both prevented from passing out of the control apparatus 32. Accordingly, the output signal $P_{32}$ of the control apparatus 32 at the predetermined altitude would appear to be essentially zero. However, the actual output signal $P_{32}$ is likely to be somewhere between $P_o$ and $P_c$, depending on the preceding position of the piston 60 as well as the downstream load imposed by the air valve 25 of FIG. 1.

Figures 3, 4:
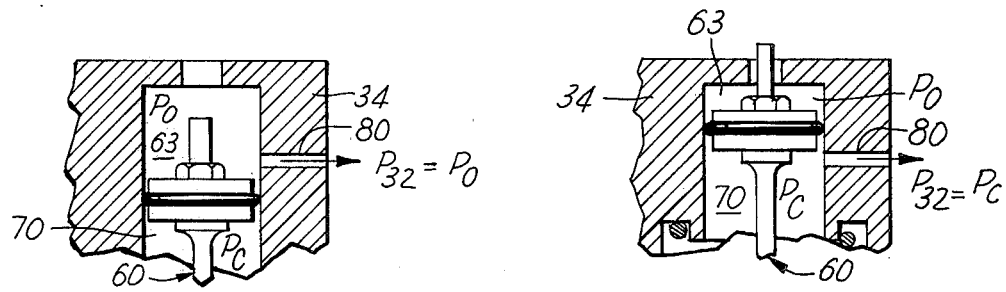
FIGS. 3 and 4 are simplified, partially sectioned views, showing a portion of the control apparatus of FIG. 2.

Referring now to FIGS. 2 and 3, the operation of the apparatus 32 will be described for altitudes below the predetermined altitude. Under these conditions, the ambient air pressure $P_o$ is sufficient to compress the bellows 36. This causes connecting link 38 to pivot in such a way as to free poppet 42 for movement. With poppet 42 free for movement, and the pressure in region 70 at $P_c$, the servo pressure $P_x$ in region 74 approaches $P_o$ because conduit 50 is now coupled to chamber 48 which is at ambient air pressure $P_o$. This imbalance between the pressures in chambers 70 and 74 causes the piston 60 to approach one extreme position, as partially shown in FIG. 3. As the piston 60 moves toward this extreme position, the region 63, at ambient pressure $P_o$, is coupled to the output port 80. Thus, for below the predetermined altitude condition, the pneumatic output $P_{32}$ of the apparatus 32 is $P_o$, or ambient air pressure.

However, as noted previously, as the altitude is increased to the predetermined altitude, the value of ambient air pressure, $P_o$, is decreased so that the piston 60 moves in the opposite direction and reaches the position of FIG. 2. Referring now to FIGS. 2 and 4, as the apparatus 32 reaches altitudes greater than the predetermined altitude, ambient air pressure $P_o$ decreases to a point at which the bellows 36 expands and moves sufficiently to cause the poppet 42 to be fully seated, thereby sealing chamber 48 from conduit 50. When the poppet is in this seated condition, the pressure in region 70 is still $P_c$. However, the pressure $P_x$ in region 74, which is coupled to region 70 through servo orifice 64A, approaches the level of pressure $P_c$. Although the pressure levels in regions 70 and 74 are approximately the same, pressure $P_x$ acts only on the outer face of piston head 64, forcing it upwards, while pressure $P_c$ in region 70 acts on the inner faces of piston portions 62 and 64 and also interfaces with the ambient pressure $P_o$ in region 63. The net effect of this pressure distribution is to cause piston 60 to move upwards toward a second extreme position, as shown in FIG. 4. As shown in FIG. 4, as a result of such upward movement of the piston 60, the region 70 at pressure $P_c$ is coupled to the output port 80 of the control apparatus 32. Thus, above predetermined altitudes, the pneumatic output signal $P_{32}$ is equal to $P_c$.

Figure 5:
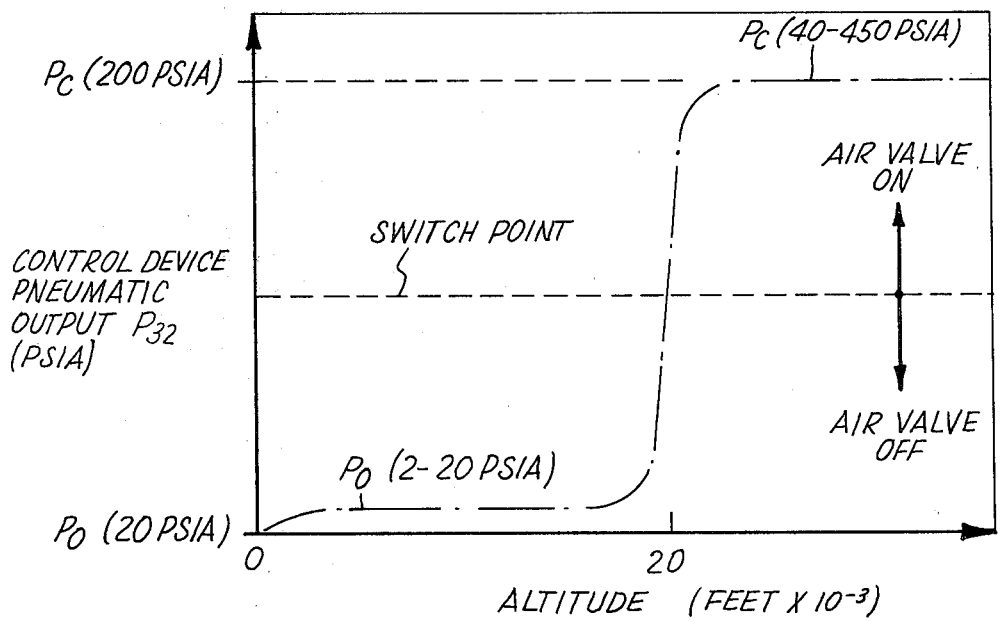
FIG. 5 is a graph depicting the magnitude of the pneumatic output signal of the altitude sensing control apparatus of the present invention as a function of altitude.

Referring now to FIG. 5, it can be observed that the pneumatic output signal $P_{32}$ of the altitude sensing control apparatus 32 sharply varies between pneumatic signal $P_o$ and pneumatic signal $P_c$. This sharp variation is highly desirable as it allows the apparatus 32 to control air valve 25 of FIG. 1 and to cause switching with a high degree of accuracy at the predetermined altitude. For example, for aircraft applications it may be desirable to cause switching at 20,000 feet which is equivalent to an ambient air pressure $P_o$ of about 7 psia. In this connection, it is to be appreciated that for a conventional aircraft gas turbine engine, the range of ambient air pressure is from about 2 psia to about 20 psia; the range of compressor discharge pressure or pneumatic signal $P_c$ is approximately 40 psia to approximately 450 psia. At 20,000 feet, a typical ambient air pressure $P_o$ is about 7 psia and a typical compressor discharge pressure or pneumatic signal $P_c$ is about 200 psia.

Referring again to FIG. 2, it is desirable to protect the servo orifice 64A from blockage. One means to protect the servo orifice 64A is through the use of a conventional chip catcher 76. Also, indicating link 40 is preferably included to provide indication of bellows 36 operability. In this connection, indicating link 40 may be positioned to be slightly recessed (shown in dashed lines) at ground level position of an operable bellows. By an operable bellows, it is meant one which is suitably compressed at ground level. Drive piston 60 may also include indicator means for indicating its operability. For example, the piston 60 may include an indicator extension 60P for indicating operability of the piston 60. More particularly, the extension 60P may be positioned to be slightly recessed (shown in dashed lines) at ground level when the piston 60 should be approaching the extreme position of FIG. 3. It may also be desirable to provide adjustment means 78 for calibration purposes. More particularly, adjustment means 78 may simply comprise a variable compressible spring 78S for ensuring the appropriate movement of the bellows 36, connecting link 38, and poppet 42 through operating altitudes, including the predetermined altitude. Also, the control apparatus 32 may be provided with spring means 79 for encouraging the piston 60 to be in the correct position for ground shutdown, which would be the same as the low altitude position shown in FIG. 3. Of course, if desired, the spring means 79 may provide other null positions for the piston 60.

Figure 6:
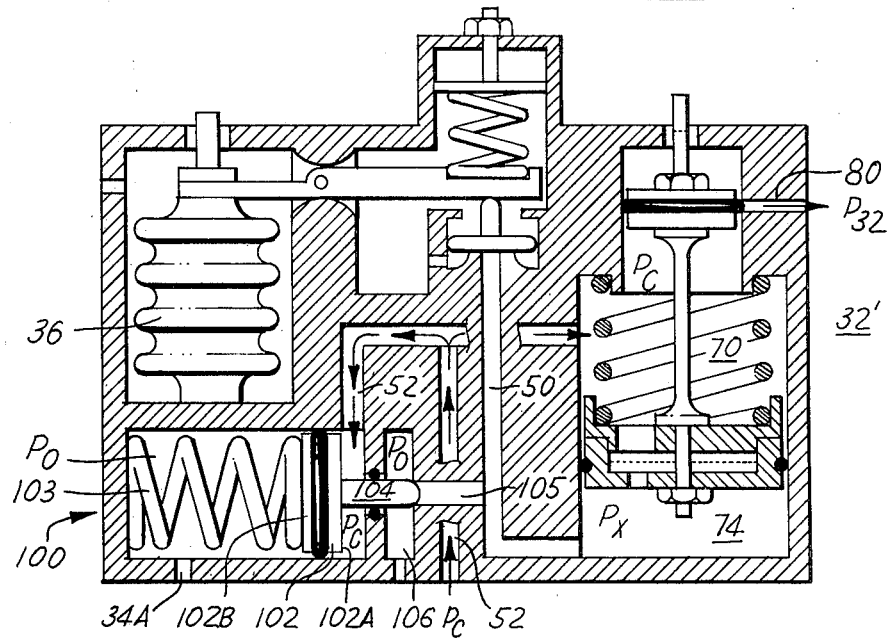
FIG. 6 is a simplified, partially section view taken as in FIG. 2, showing another form of the altitude sensing control apparatus of the present invention.

Referring now to FIG. 6, another form of the altitude sensing control apparatus of the present invention is generally designated 32'. The apparatus 32' of FIG. 6 is similar to the apparatus 32 of FIG. 2 so that, wherever possible, like reference numerals have been employed to represent like elements.

The altitude sensing control apparatus 32' is additionally provided with backup means 100 for ensuring desirable control operation in the event of a failure in the first stage of the apparatus. The backup means 100 includes backup piston 102. Piston 102 includes an extension 104 for sealing a port 105 which communicates with conduit 50. In the control apparatus 32', conduit 52, which is at pressure $P_c$, is also coupled to one face 102A of the piston 102. Ambient pressure $P_o$ is coupled to the opposing face 102B of piston 102. Spring 103 is provided to provide a biasing force which biases the piston 102 into sealing arrangement with the port 105.

It is well known that, in the operation of a typical gas turbine, the compressor discharge pressure, $P_c$, s greatest at relatively lower altitudes and smallest at relatively higher altitudes. For example, for altitudes less than 20,000 feet, compressor discharge pressure, $P_c$, is typically between about 225 psia to about 250 psia while for altitudes greater than 20,000 feet, $P_c$ is typically less than 225 psia.

The purpose of the backup means 100 is to drop the servo pressure $P_x$ in region 74 to $P_o$ when a certain compressor discharge pressure, or $P_c$, is approached. For example, when $P_c$ reaches a pressure such as 250 psia, corresponding to an altitude below 20,000 feet, the piston 102 would be forced to the left (not shown) thereby opening the conduit 105 and allowing the servo pressure $P_x$ of region 74 to communicate with the ambient air pressure $P_o$ of chamber 106. Thus, with the backup control means 100, should the bellows 36, for example, fail near sea level, causing the poppet 42 to reach its seated position, the apparatus 32 of FIG. 2 would develop an output signal $P_{32}$ of $P_c$ value, causing the valve 25 to open. However, in the apparatus 32' of FIG. 6, under such failed bellow condition at such altitude, the piston 60 would be forced downward and the output signal $P_{32'}$ would constitute $P_o$ thereby causing the air valve 25 to be in the off position. This operation of the apparatus 32' is highly desirable in that, for aircraft applications, undesirable blade to shroud contact is not expected when the engine is below a certain compressor discharge pressure, or $P_c$. In this connection, the compressor discharge pressure for actuation of the backup means 100 is typically 225-250 psia.

Although the invention has been described in connection with an air valve for clearance control purposes, the invention is generally applicable to applications requiring a highly accurate, repeatable, and reliable pneumatic, altitude control sensing apparatus. Indeed, the apparatus of the present invention is suitable for any application in which an altitude dependent pneumatic output signal is needed to operate another mechanism which may, for example, comprise a valve. Also, although it is preferable to employ the compressor discharge pressure of the engine 10 as the control signal $P_c$, for some applications, other pressurized outputs may be employed, i.e., intermediate compressor stages. Further, for some applications, other engine pressurizing sections may be utilized to provide the control signal $P_c$. For example, the fan section may be employed to provide a pressurized output airflow therefrom as the control signal $P_c$.

While the present invention has been described with reference to specific embodiments thereof, it will be obvious to those skilled in the art that various changes and modifications may be made without departing from the invention in its broader aspects. It is contemplated in the appended claims to cover all such variations and modifications of the invention which come within the true spirit and scope of my invention.

What is claimed as new and desired to be secured by Letters Patent of the United States is:

1. Altitude sensing control apparatus for a gas turbine engine of the type including a compressor section which receives an input airflow and develops a pressurized output airflow, which comprises:
   (a) means coupled to ambient air for developing a first pneumatic signal representative of ambient air pressure;

(b) means coupled to said compressor section for receiving a portion of said pressurized output airflow and developing a second pneumatic signal representative of said pressurized output airflow; and
(c) pneumatic valve switching means for receiving said first and second pneumatic signals and developing a control apparatus pneumatic output signal in which said pneumatic valve switching means includes a first stage having a poppet valve for driving a second stage, including a drive piston, said piston being driven in a first direction for ambient air pressures greater than said predetermined value and being driven in a second opposing direction for ambient air pressures less than said predetermined value, said piston second stage including an output port, said pneumatic output signal at said output port comprising said first pneumatic signal when said piston is driven in the first direction and comprising said second pneumatic signal when said piston is driven in the second direction, said poppet valve being coupled to a bellows through a medially pivotable connecting link, said piston including a pair of opposing head portions separated by a rod portion and being sealingly located in said housing, a first region being defined between one of the opposing head portions of said piston and said housing, a second region being defined between said opposing head portions of said housing and a third region being defined between the other opposing head portion of said housing, wherein said second region is coupled to receive said second pneumatic signal, said first region is coupled to receive said first pneumatic signal, said third region is coupled through said poppet valve to a region in said housing at ambient air pressure, said one opposing head portion including a servo orifice therethrough coupling said second region to said third region with said third region developing a third pneumatic signal representative of a servo pressure for controlling the movement of said piston, wherein:
  (i) said pneumatic output signal comprises said first pneumatic signal for ambient air pressures greater than a predetermined value which is representative of a predetermined altitude, and
  (ii) said pneumatic output signal comprises said second pneumatic signal for ambient air pressures less than said predetermined value.

2. Altitude sensing control apparatus in accordance with claim 1 in which said output port is coupled to said first region when said piston is driven in the first direction and is coupled to said second region when said piston is driven in the second direction.

3. Altitude sensing control apparatus in accordance with claim 2 which includes backup control means for ensuring predetermined operation of said piston second stage in the event of failure in said first stage.

4. Altitude sensing control apparatus in accordance with claim 3 in which said backup control means includes backup piston means coupled to receive said second pneumatic signal and to vent said third pneumatic signal out of said third region when said second pneumatic signal is greater than a predetermined value.

5. Altitude sensing control apparatus in accordance with claim 2 which includes indicating means for indicating operability of said bellows.

6. Altitude sensing control apparatus in accordance with claim 2 which includes indicating means for indicating operability of said drive piston.

* * * * *

UNITED STATES PATENT AND TRADEMARK OFFICE
CERTIFICATE OF CORRECTION

PATENT NO. : 4,391,290
DATED : July 5, 1983
INVENTOR(S) : Raymond L. Williams

It is certified that error appears in the above—identified patent and that said Letters Patent is hereby corrected as shown below:

Column 7, claim 1, lines 29 and 31, delete "of" and in its place insert --and--.

*Signed and Sealed this*

*Twenty-seventh* Day of *December 1983*

[SEAL]

*Attest:*

GERALD J. MOSSINGHOFF

*Attesting Officer* — *Commissioner of Patents and Trademarks*